(12) United States Patent
Kunisetty et al.

(10) Patent No.: US 9,106,939 B2
(45) Date of Patent: Aug. 11, 2015

(54) LOCATION-BASED PROGRAM LISTING

(75) Inventors: Sridhar Kunisetty, Fremont, CA (US); Varma L. Chanderraju, San Jose, CA (US); Vinay Kalra, San Jose, CA (US); Sanjeev K. Mishra, Sunnyvale, CA (US); Bharath R. Rao, Santa Clara, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 283 days.

(21) Appl. No.: 13/568,193

(22) Filed: Aug. 7, 2012

(65) Prior Publication Data

US 2014/0047063 A1 Feb. 13, 2014

(51) Int. Cl.
| | |
|---|---|
| *G06F 15/16* | (2006.01) |
| *G06F 13/00* | (2006.01) |
| *G06Q 30/00* | (2012.01) |
| *H04N 21/258* | (2011.01) |
| *H04N 21/262* | (2011.01) |
| *H04N 21/2665* | (2011.01) |
| *H04N 21/45* | (2011.01) |

(Continued)

(52) U.S. Cl.
CPC ..... *H04N 21/25841* (2013.01); *H04N 21/2665* (2013.01); *H04N 21/26283* (2013.01); *H04N 21/4524* (2013.01); *H04N 21/4532* (2013.01); *H04N 21/47202* (2013.01); *H04N 21/8126* (2013.01); *G06F 17/30029* (2013.01); *H04L 65/00* (2013.01); *H04L 67/18* (2013.01); *H04L 67/306* (2013.01)

(58) Field of Classification Search
CPC ....... H04L 67/18; H04L 67/306; H04L 65/00; G06F 17/30029
See application file for complete search history.

(56) References Cited

U.S. PATENT DOCUMENTS

| | | | | |
|---|---|---|---|---|
| 4,941,170 A | * | 7/1990 | Herbst | ..................... 379/100.07 |
| 5,550,576 A | | 8/1996 | Klosterman | |

(Continued)

FOREIGN PATENT DOCUMENTS

| | | |
|---|---|---|
| EP | 1193976 A2 | 4/2002 |
| EP | 2164193 A1 | 3/2010 |

(Continued)

OTHER PUBLICATIONS

Patent Cooperation Treaty, International Search Report and Written Opinion of the International Searching Authority for International Application No. PCT/US2013/052470, Oct. 31, 2013, 12 pages.

(Continued)

*Primary Examiner* — Brian P Whipple
*Assistant Examiner* — Michael A Chambers
(74) *Attorney, Agent, or Firm* — Lowenstein Sandler LLP

(57) ABSTRACT

Disclosed are methods that aid users, especially users temporarily staying in locations remote from home, in finding and accessing media content. A program listing tailored for the user's current location, and showing only services actually available at that location, is created and presented to the user. In some embodiments, the user interacts with the listing to access available media content items. If the user has expressed specific location-based preferences, then those preferences can be taken into account when creating the listing. If a service subscribed to by the user is not available at this remote location, then an alternate provider will be searched for, and, if found, the user's favorite shows can be added to the created program listing.

22 Claims, 5 Drawing Sheets

(51) Int. Cl.
  *H04N 21/472* (2011.01)
  *H04N 21/81* (2011.01)
  *H04L 29/06* (2006.01)
  *H04L 29/08* (2006.01)
  *G06F 17/30* (2006.01)

(56) References Cited

U.S. PATENT DOCUMENTS

| | | | |
|---|---|---|---|
| 6,266,664 B1 * | 7/2001 | Russell-Falla et al. | 707/700 |
| 6,910,191 B2 | 6/2005 | Segerberg et al. | |
| 7,107,549 B2 * | 9/2006 | Deaton et al. | 715/836 |
| 7,203,597 B2 * | 4/2007 | Sato et al. | 701/516 |
| 7,793,321 B2 | 9/2010 | Simms et al. | |
| 8,051,130 B2 * | 11/2011 | Logan et al. | 709/204 |
| 8,063,923 B2 * | 11/2011 | Lilleness et al. | 715/738 |
| 8,112,776 B2 * | 2/2012 | Schein et al. | 725/52 |
| 8,165,804 B2 * | 4/2012 | Takashima | 701/430 |
| 8,229,499 B2 * | 7/2012 | Yoon et al. | 455/552.1 |
| 8,265,990 B2 * | 9/2012 | Penberthy et al. | 705/14.1 |
| 8,281,345 B2 * | 10/2012 | Baumgartner et al. | 725/78 |
| 8,296,335 B2 * | 10/2012 | Bouve et al. | 707/806 |
| 8,363,637 B2 * | 1/2013 | Bettis et al. | 370/352 |
| 8,386,387 B2 * | 2/2013 | Johnson et al. | 705/51 |
| 8,417,720 B2 * | 4/2013 | Sukanen et al. | 707/769 |
| 8,635,658 B2 * | 1/2014 | Patten et al. | 725/115 |
| 8,706,542 B2 * | 4/2014 | O'Meara et al. | 705/7.16 |
| 8,762,854 B2 * | 6/2014 | Oztaskent | 715/733 |
| 8,880,397 B2 * | 11/2014 | Almaer et al. | 704/235 |
| 8,898,705 B2 * | 11/2014 | Melnychenko et al. | 725/50 |
| 2003/0115601 A1 * | 6/2003 | Palazzo et al. | 725/42 |
| 2003/0191578 A1 | 10/2003 | Paulauskas et al. | |
| 2003/0216963 A1 * | 11/2003 | Ishiwaka et al. | 705/14 |
| 2005/0165816 A1 | 7/2005 | Schiller et al. | |
| 2006/0035610 A1 | 2/2006 | Potrebic | |
| 2007/0109262 A1 * | 5/2007 | Oshima et al. | 345/156 |
| 2007/0112935 A1 | 5/2007 | Espelien | |
| 2008/0022298 A1 | 1/2008 | Cavicchia | |
| 2008/0155602 A1 | 6/2008 | Collet et al. | |
| 2008/0242280 A1 * | 10/2008 | Shapiro et al. | 455/414.3 |
| 2009/0019374 A1 * | 1/2009 | Logan et al. | 715/753 |
| 2009/0030931 A1 | 1/2009 | Khivesara et al. | |
| 2010/0058390 A1 | 3/2010 | Harris et al. | |
| 2010/0146077 A1 * | 6/2010 | Davies et al. | 709/219 |
| 2010/0169369 A1 | 7/2010 | Wang et al. | |
| 2010/0205625 A1 | 8/2010 | Beyabani et al. | |
| 2010/0211978 A1 | 8/2010 | Hsiao | |
| 2010/0287588 A1 | 11/2010 | Cox et al. | |
| 2010/0318542 A1 * | 12/2010 | Davis | 707/759 |
| 2011/0014913 A1 * | 1/2011 | Yoon et al. | 455/435.3 |
| 2011/0093311 A1 * | 4/2011 | Hariharan et al. | 705/7.34 |
| 2011/0171941 A1 * | 7/2011 | Cusick et al. | 455/414.1 |
| 2012/0198570 A1 | 8/2012 | Joa et al. | |
| 2013/0060908 A1 * | 3/2013 | Whitmyer, Jr. | 709/219 |
| 2013/0103397 A1 * | 4/2013 | Almaer et al. | 704/233 |
| 2013/0110921 A1 * | 5/2013 | Logan et al. | 709/204 |
| 2013/0111511 A1 * | 5/2013 | Besehanic | 725/14 |
| 2013/0166193 A1 * | 6/2013 | Goldman et al. | 701/410 |
| 2013/0263184 A1 * | 10/2013 | Melnychenko et al. | 725/50 |
| 2014/0047479 A1 | 2/2014 | Kunisetty et al. | |
| 2014/0047488 A1 | 2/2014 | Kunisetty et al. | |
| 2014/0165091 A1 * | 6/2014 | Abhyanker | 725/27 |
| 2014/0180818 A1 * | 6/2014 | Mistler et al. | 705/14.57 |

FOREIGN PATENT DOCUMENTS

| | | |
|---|---|---|
| WO | 2008141477 A1 | 11/2008 |
| WO | 2009016544 A2 | 2/2009 |
| WO | WO2014025547 A1 | 2/2014 |
| WO | WO2014025562 A1 | 2/2014 |
| WO | WO2014025634 A1 | 2/2014 |

OTHER PUBLICATIONS

United States Patent and Trademark Office, "Non-Final Rejection" for U.S. Appl. No. 13/568,184 dated Nov. 8, 2013, 17 pages.

Xu Zhang: "Personalized ESG for converged digital broadcast and 3G mobile services", Jan. 13, 2008, XP055080209, Retrieved from the Internet: URL:http://www2.imm.dtu.dk/pubdb/views/edoc)download.php/5626/pdf/imm5626.pdf3 [retrieved on Sep. 20, 2013], all pages.

Patent Cooperation Treaty, International Search Report and Written Opinion of the International Searching Authority for International Application No. PCT/US2013/052163, Oct. 8, 2013, 13 pages.

Patent Cooperation Treaty, International Search Report and Written Opinion of the International Searching Authority for International Application No. PCT/US2013/053378, Oct. 22, 2013, 10 pages.

USPTO; Office Action for U.S. Appl. No. 13/568,198, mailed Nov. 8, 2013.

* cited by examiner

LOCATION-BASED PROGRAM LISTING

CROSS-REFERENCE TO RELATED APPLICATIONS

The present application is related to U.S. Patent Application Publication No. 2014/0047488 and U.S. Patent Application Publication No. 2014/0047479, filed on an even date herewith.

TECHNICAL FIELD

The present disclosure is related generally to providing a listing of available programming and, more particularly, to providing a location-based program listing.

BACKGROUND

Industry reports show that viewers are spending more time than ever watching television and using other media-delivery services. In response, new services are developed almost daily. Interactive and social applications are added to the traditional "content-consumption" experiences (e.g., broadcast television programming). For example, a television screen can show an interactive user interface overlaid onto the television's traditional broadcast content, the user interface supporting an application that complements the broadcast content (e.g., an interactive sports interface overlaid onto a sports network feed).

At the same time, sources of media content are proliferating rapidly. User-stored programming and the Internet provide even more choices for a viewer. Keeping track of all of the content providers and of their diverse services has become difficult. Even finding the best source for a content item that the user has already decided to watch can be burdensome.

All of these issues are magnified for a traveler. Some media content items or delivery services familiar to the user may not be available in a location distant from the user's home. Even if the new location offers as many or even more sources of content than the user is accustomed to, the user may find it difficult to rationalize all of these new sources in order to use them effectively, especially when he has little time to learn how to navigate through the sources available in the new location.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
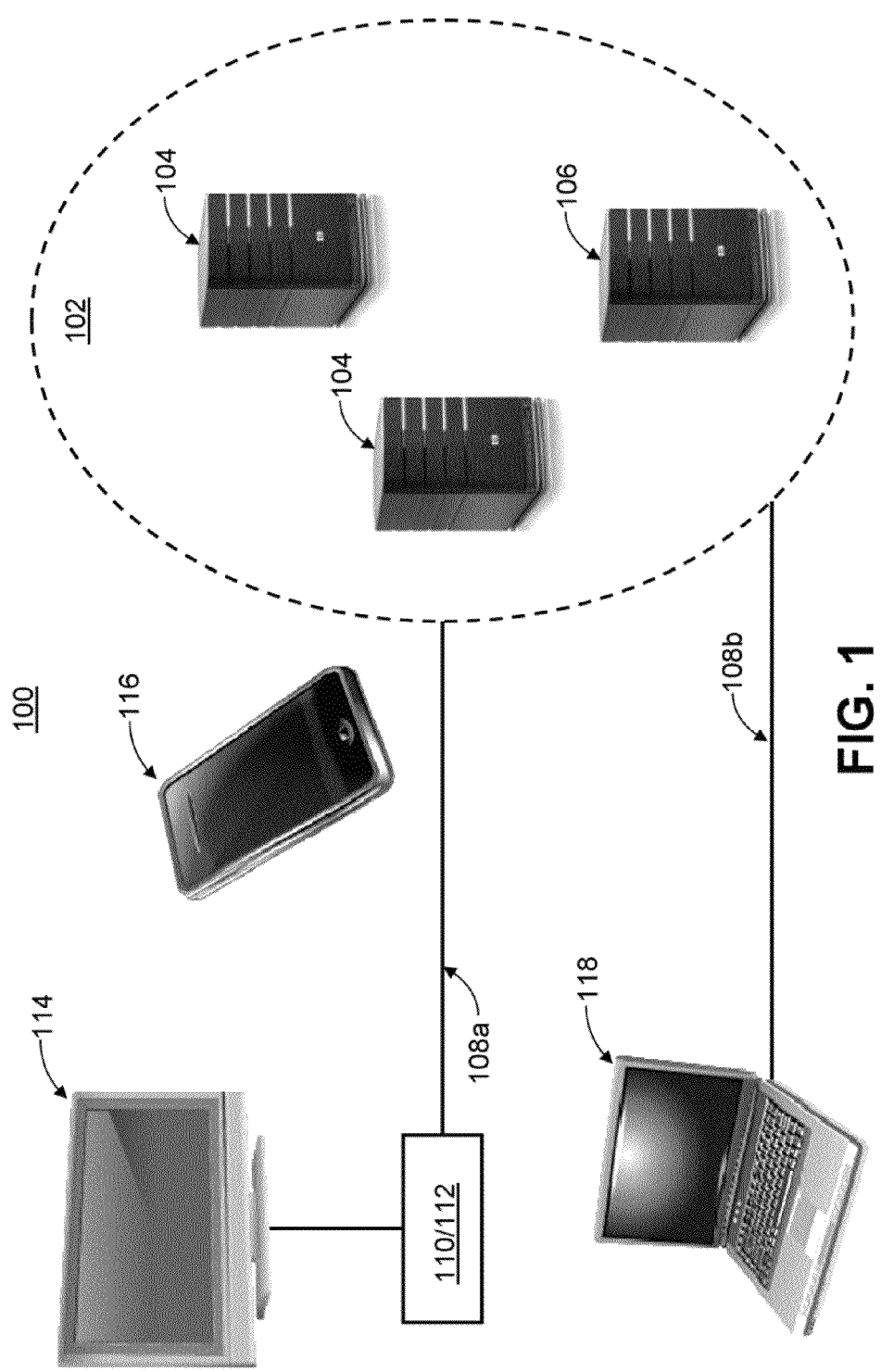
FIG. 1 is an overview of a representational environment in which the present techniques may be practiced.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The methods of the present disclosure aid users, especially users temporarily staying in locations remote from home, in finding and accessing media content. A program listing tailored for the user's current location, and showing only services actually available at that location, is created and presented to the user. In some embodiments, the user interacts with the listing to access available media content items. If the user has expressed specific location-based preferences, then those preferences can be taken into account when creating the listing. If a service subscribed to by the user is not available at this remote location, then an alternate provider will be searched for, and, if found, the user's favorite shows can be added to the created program listing. Specific embodiments of these ideas are described below with reference to FIGS. 3 through 5.

Before getting to the specific methods, consider the representative communications environment 100 of FIG. 1. Connected together via any or all of various known networking technologies 102 are servers such as content-information sources 104 and an access manager 106. Multiples of these servers 104, 106 can exist and can work together, as discussed below.

The content-information sources 104 provide, via the networking technologies 102, information about media content available to users. Such content can include, for example, movies, television programs, audio (e.g., radio) programming, Internet media downloads, and games. The information provided can include metadata describing the media content along with access information (possibly including pricing or subscription information) useful when a user wishes to access the media content item.

(Note that for purposes of the present discussion, it is the provision of information about media content items that is central. In many cases, the same content-information sources 104 provide not only information about media content items but the media content items themselves.)

First consider a representative user's home communications environment, as illustrated by the top half of FIG. 1. At least one content-information source 104 is a head-end server that provides subscription cable television services to the user. Traditional end-user devices are supported by "wireline" network technologies (e.g., fiber, wire, and cable) 108a. For example, a set-top box 110 generally receives television programming from various channel providers and provides a user interface (e.g., an interactive program guide) for selecting and viewing content from the cable provider. A digital video recorder (DVR) 112 can store programming for later viewing.

Video content may be viewed on a television monitor 114. In some situations, a smart-phone 116 can access both television content and web-based services wirelessly. A home gateway, tablet computer, kiosk, digital sign, or media-restreaming device (not shown) are some other possible end-user devices.

(A media-restreaming device transfers content between disparate types of networks. For example, it receives content from a cable system 108a and then transmits that content over a local radio link such as WiFi to the smart-phone 116. The media-restreaming device usually operates in both directions to carry messages between the networks. In some embodiments, aspects of the present disclosure are practiced by a media-restreaming device.)

As indicated above, television programming can be delivered to non-traditional subscriber devices such as the smart-phone 116. This smart-phone 116 communicates wirelessly to a wireless base station (not shown but known in the art) to access the public switched telephone network, the Internet, or other networks to access web-based services as well as the television-delivery services provided by the channel servers.

The user is familiar with this home environment and with the content opportunities that it provides. The user knows, for example, whether to go to his cable-television service for a favorite show or to some other provider.

Now consider the user when away from home on a business trip (bottom half of FIG. 1). Here, the user's laptop 118 can be connected via a cable 108*b* or wirelessly to media-delivery networks 102 including the Internet. However, the various media-delivery services that the user is familiar with in his home environment may not be available in this remote location. For example, he may not be able to connect to the cable-television provider with which he has a home subscription, and media offerings available at this remote location may differ widely from services familiar in his home environment.

Figure 2:
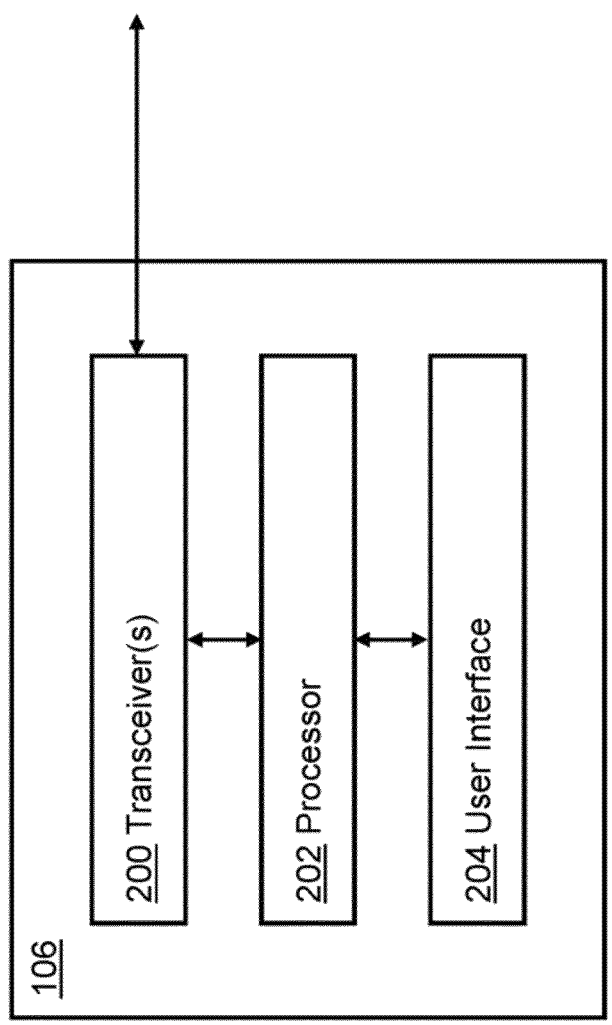
FIG. 2 is a schematic diagram of a representational access manager.
Figure 3:
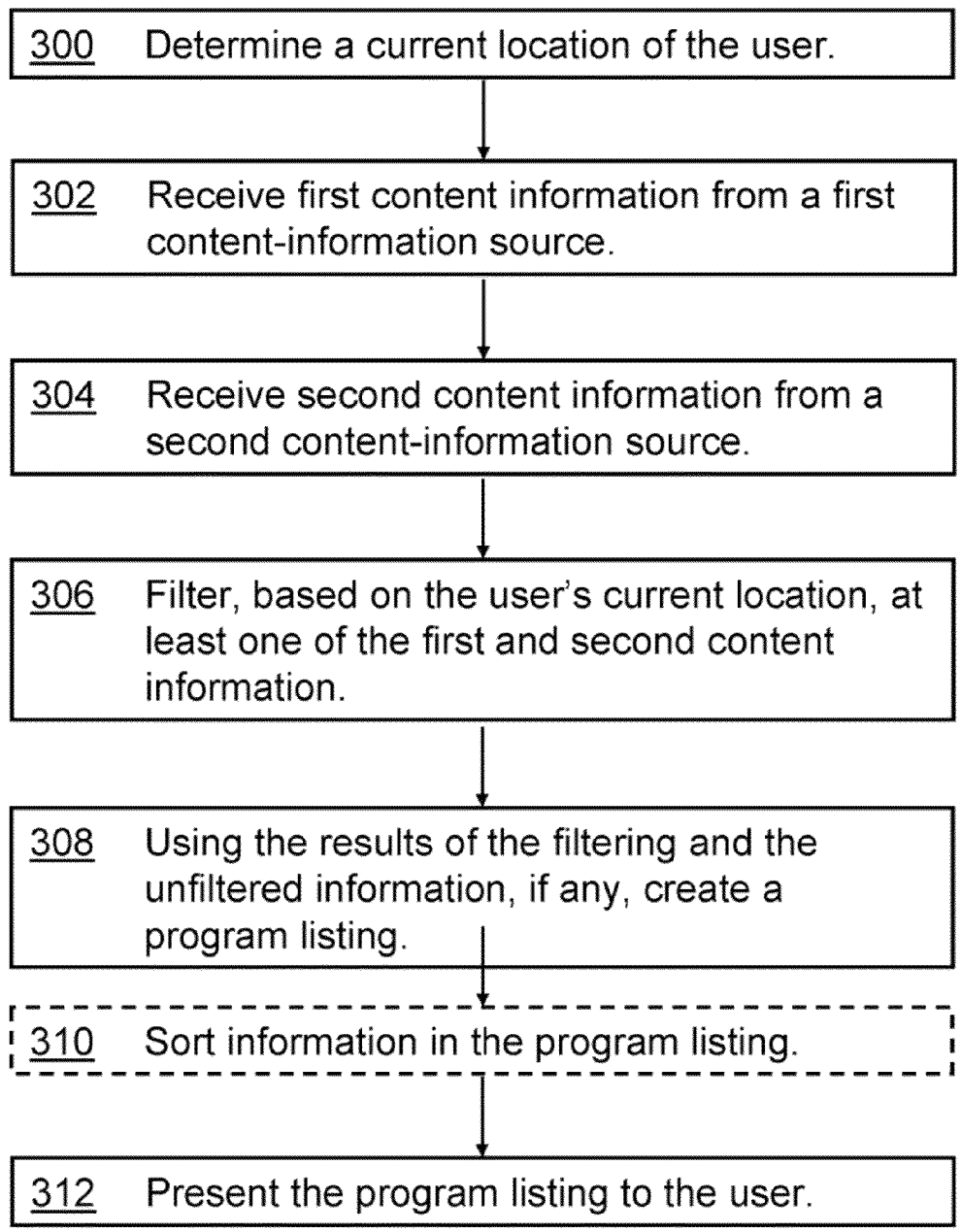
FIG. 3 is a flowchart of a method for presenting a program listing based on a user's current location.
Figure 4:
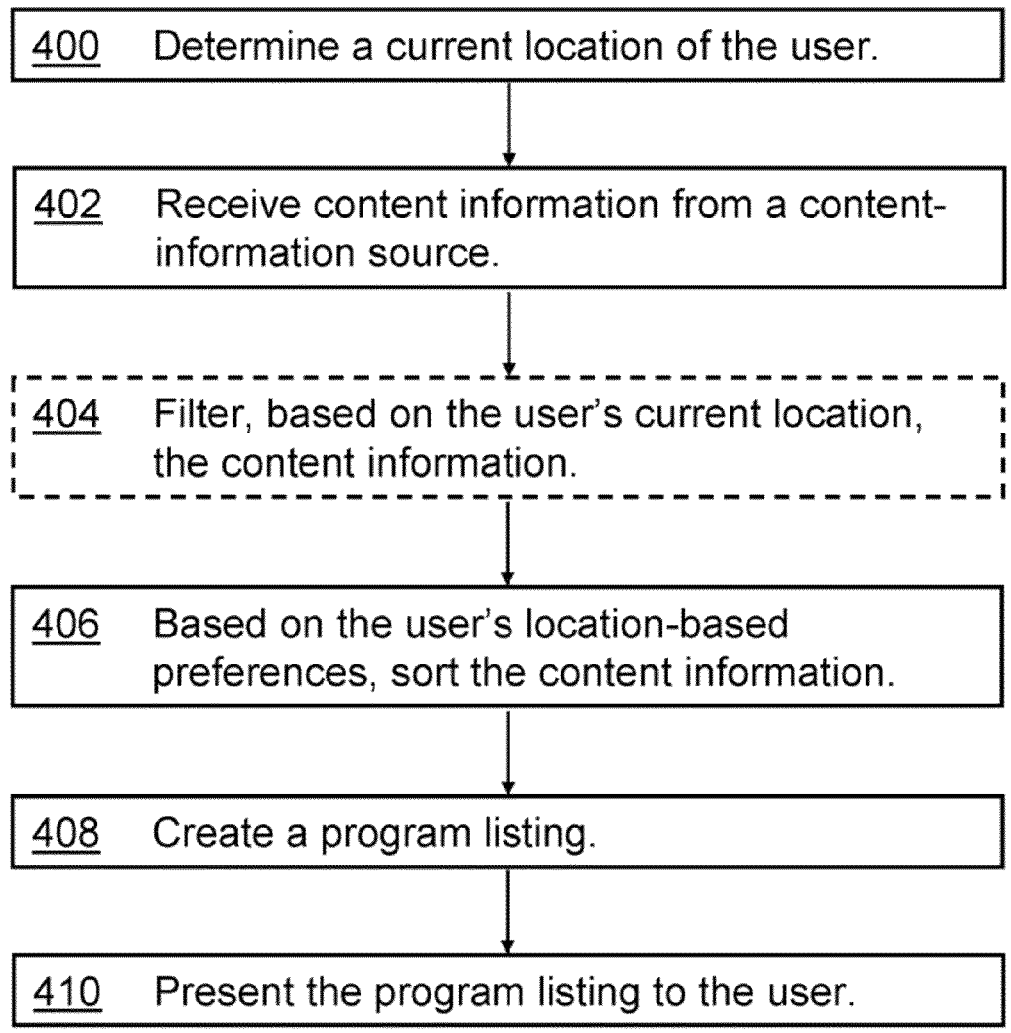
FIG. 4 is a flowchart of a method for presenting a program listing that accounts for a user's location-based preferences.
Figure 5:
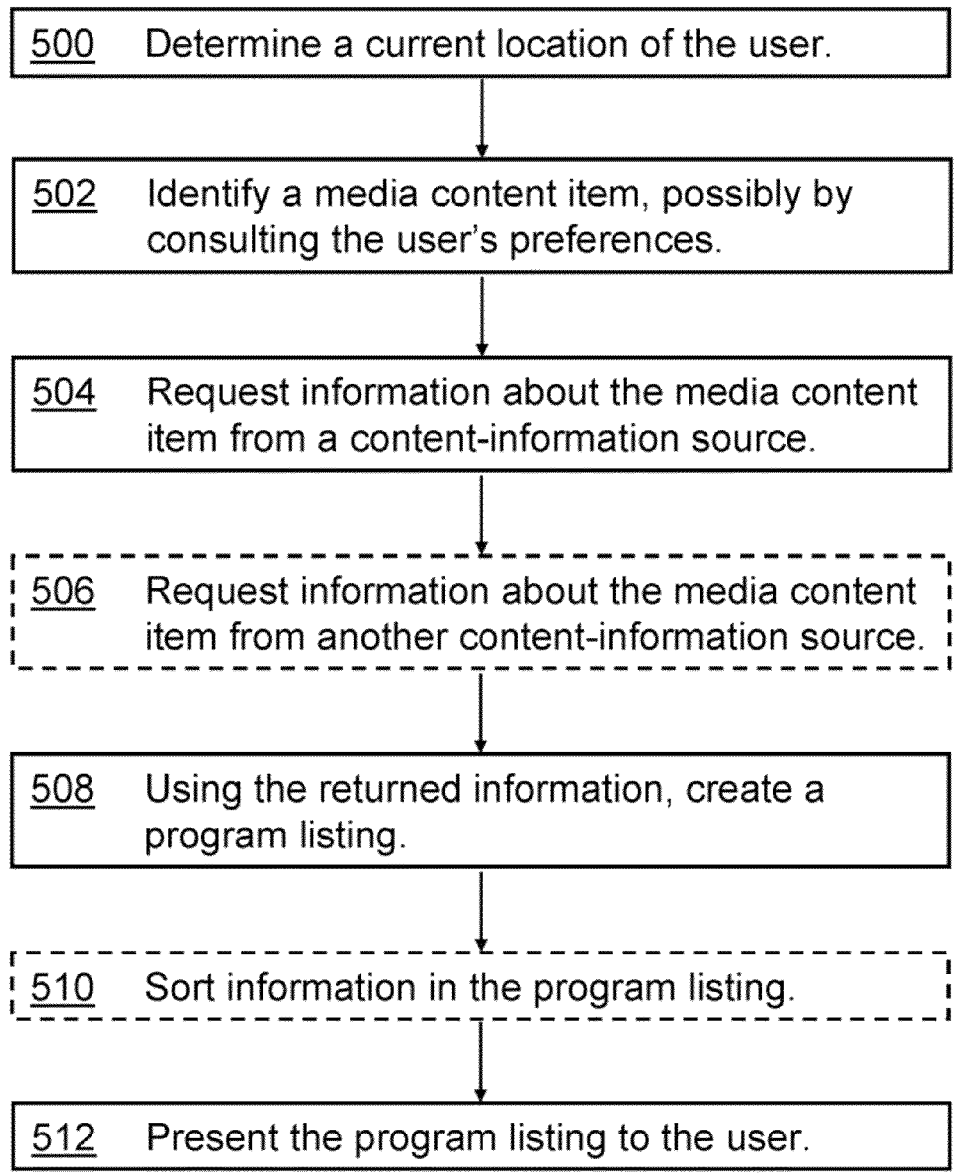
FIG. 5 is a flowchart of a method for finding a source for a specific media content item.

Techniques that help this user are discussed below with reference to FIGS. 3 through 5. Before proceeding there, however, FIG. 2 shows the major components of a representative access manager 106. Communications interfaces (also called transceivers) 200 request and receive media-content information and other messages. A processor 202 controls the operations of the device 106 and, in particular, supports aspects of the presently disclosed methods as illustrated in FIGS. 3 through 5. An optional user interface 204 supports a user's (or administrator's) interactions with the device 106. Specific uses of these components are discussed as appropriate below.

The access manager 106 is in essence a service that may be hosted just about anywhere, for example, on a special server, on the user's laptop 118, in one of the content-information sources 104, on any of the other devices shown in FIG. 1, or out in the Internet "cloud."

FIG. 3 presents a method for creating a program listing that includes only media content items available at the user's current location. The method begins in step 300 where the access manager 106 determines the current location of the user. Any known technology can be used here, from GPS to network-derived positioning to explicitly asking the user where he is located.

(Although step 300 is described in terms of the user's current location, that is not strictly necessary. For example, a user at home in Chicago may wish to apply the methods of FIG. 3 to determine what media-delivery services will be available to him when he takes a business trip to Boston. In that case, step 300 applies the user's target location (Boston) rather than his current one (Chicago). For ease in the present discussion, the user's target location is referred to herein as his "current" location.)

In step 302, the access manager 106 requests content information from a first content-information source 104. This source 104 can be associated with a media service subscribed to by the user such as a television service, an audio service, a video-on-demand service, an Internet-content service, or a game service. The information can include any type of useful metadata associated with the media content items available from that service, including times when those content items are available (baseball games may be blacked out for a period surrounding actual game time, for example), access information such as pricing for premium items, and the like. In some cases, the information returned by the content-information sources 104 is in the form of a program listing or an interactive program guide.

In step 304, the access manager 108 requests the same type of content information from a second content-information source 104. This second source 104 can be associated with, for example, another subscription service, a broadcast service, a television service, an audio service, a video-on-demand service, an Internet-content service, or a game service. The second source 104 could even be the user's DVR 112, storage on the access manager 106 itself, or another media store accessible by the user. Step 304 could be repeated for multiple possible content-information sources 104. For example, step 304 could be repeated searching for information about, and access to, each media-delivery service subscribed to by the user in his home locale or regularly used by him. In a general case, the content-information sources 104 accessed in step 304 are those accessible (possibly with an extra payment) from the user's current location (as determined in step 300).

The access manager 106 may use other methods to gather the content information of steps 302 and 304. For example, after retrieving a content listing in step 304, the access manager 106 may not be able to tell whether or not a particular media content item is available. (Some media-delivery services provide notoriously incomplete listings of their offerings.) To find out, the access manager 106 can request access to the particular media content item. The response to this request tells the access manager 106 whether or not the media content item is available from that source.

It is very possible that some of the information retrieved in steps 302 and 304 is not useful at the user's current location. For example, a subscription service might have a limited coverage area that may not extend to the user's current location, or the subscription service may cover the user's current location but with location-based content restrictions. Internet-based media-delivery services may be available everywhere, but their content may be restricted by local regulations. A user's Netflix™ subscription, for example, may only be able to (or allowed to) deliver some of its content to locations in the United States. Step 306 attempts to filter out of the information retrieved in steps 302 and 304 any information that is not currently useful. In addition to location restrictions, time restrictions can be applied to the filtering. If, for example, the user will only be in the current location for a couple more days, then programming delivered beyond the end of the user's stay is probably irrelevant. Also, redundancies can be eliminated when the same media content item is available from multiple sources. Because different content-information sources 104 may describe the same media content item using different metadata, those different metadata could be reconciled as part of this step 306.

Sometimes, the same media content item is available from different sources, but the access price may vary. Even a subscription service may charge a "roaming" fee (similar to the fees know in the cellular-telephony world) if the subscriber wishes to access the media content item at a location remote from his home. In these cases, the filtering of step 306 can keep only the least expensive source.

The filtering of step 306 can also be based on preferences of the user explicitly stated or implicitly derived. The user, for example, may historically only watch sporting events while travelling, so all other types of content are filtered out. Social-presence information (if known) can also be applied to filter out some content.

Although step 306 is shown in FIG. 3 as distinct from steps 302 and 304, in some embodiments the filtering is built into the content-information retrieval steps. The access manager 106 may, for example, request in step 304 only listings for the next couple of days.

The (possibly filtered) information of the above steps is merged into a program listing in step 308. In some embodiments, this listing gives the user one place to find all of the media content items from all of the media-delivery sources that are relevant to him at his current location. This makes the user's media consumption much more efficient when in an unfamiliar (and possibly quickly changing) environment.

To make the user's choice process even easier, the program listing can optionally be sorted in step 310, using any criteria relevant to the user. Some criteria include user preferences, again explicit or implicit, social-presence information, and access-price information. A user with limited free time may wish to sort the listings by the run length of the media content items.

Finally, the program listing is presented to the user in step 312. If the access manager 106 is hosted by the user's laptop 118 (or smart-phone 116), then the program listing is simply presented by the user interface 204 of that device. When the access manager 106 is remote from the user's device, then the program listing can be sent to the user's device in step 312, and the user device can display it to the user.

The program listing may be a simple list, but is preferably an interactive electronic program guide with logical links to the various sources of the media content items on the list. Then, the user could interact with the guide to retrieve a media content item without having to know how to access the item's source (or even know what that source is).

Note that nothing in the method of FIG. 3 (or of the methods of FIGS. 4 and 5, discussed below) is intended to subvert the rights of the various media-delivery services accessible through the listing. The created program listing is intended only to collect and provide information to the user, information publically available but possibly difficult to collect and collate, especially for a user new to the locality.

FIG. 4 presents another technique for providing a location-based program listing. The first steps 400, 402, 404 are similar to those described above with reference to FIG. 3, except that in some embodiments the method of FIG. 4 is practiced with only one content-information source 104 (although multiple sources 104 can be used).

In step 406, the retrieved content information is sorted based on preferences of the user. These preferences may be explicitly set (e.g., in a user profile tailored to travel or even to travel to this particular location) or may be inferred by observations of the user's behavioral history.

A simple example should clarify this. The user lives in San Francisco where he often watches a full-length movie starting at 9:00 p.m. However, when he travels to New York City, he only watches short pieces lasting no more than 30 minutes. (Probably because he is too busy while travelling to take time for a full-length movie.) Given this behavioral observation, step 406 can put short pieces near the top of the listing when the user is in New York City.

Another example with the same user: When in New York, he tends to watch early live programs that he cannot watch at home due to the 3-hour time difference. Again, step 406 can take advantage of this behavioral observation.

A clever use of the above two observations would apply the New York behavioral preferences whenever the user travels to the East Coast, even to locations to which he has never travelled before.

Steps 408 and 410 create and present the sorted program listing in a manner similar to that discussed above with reference to FIG. 3.

Thus, the method of FIG. 4 takes advantage of the user's location-based preferences to provide a program listing that gives priority to media content items that he would be likely to watch in a particular location (limited, of course, to what is available at that location).

FIG. 5 presents yet another technique for creating a location-based program listing. The user's current location is determined in step 500, as discussed above with reference to FIG. 3. In step 502, a particular media content item is identified that is of interest to the user. The user's preferences, explicit or implicit, and social-presence information may be useful here, or the user may have requested access to a specific media content item. The user may also have been observed watching the same (or similar) content items regularly in the past. For example, the user always watches his local news when at home or often watches the Cardinals baseball team.

Step 504 requests access to the identified media content item. If a local media-delivery service provides that media content item, then the item is added to the program listing (created in step 508). If, on the other hand, the media content item is not provided, then the access manager 106 proceeds by searching possible source after possible source (step 506) until a provider is found. (There are many reasons why a given media-delivery service cannot provide the identified media content item: There may be a local content-regulation restriction, copyright laws may prevent the delivery at the user's current location, there may be contract restrictions with the owner of the media content item, etc.) Sometimes, the requested media content item is found to be available from multiple sources, and the program listing can be sorted (510) by the access price requested by each source.

The program listing, with the requested media content item if at least one source has been found, is presented to the user in step 512.

The technique of FIG. 5 is useful when the user already knows what he wishes to view, or is in the habit of viewing the same type of material, but is not familiar with the media-delivery services available in his current location. This method is also useful when a service familiar to the user cannot deliver the desired material at his current location because of, for example, local content-regulation restrictions.

The techniques of FIGS. 3 through 5 are presented separately above, but they can all be implemented together to create one location-based program listing for the user. In all cases, the user is presented with a unified listing (including, possibly, media content items from a number of separate sources) of what is available for viewing in his current location, and the listing can be presented with items thought to be especially interesting to the user (when such information about the user is available) highlighted or otherwise preferentially presented.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method comprising:

determining a current location of a user;

determining that the current location is within a first region, wherein the first region is associated with a first user preference for a first type of media content based on previous interaction from the user with media content having the first type while the user is at a location within the first region, and wherein a second region is associated with a second user preference for a second type of media content based on previous interaction from the user with media content having the second type while the user is at a location within the second region;

identifying a first media content item based on the first user preference for media content of the first type;

identifying a second media content item based on the second user preference for media content of the second type;

receiving, by a processor at a device and from a first content-information source, first metadata associated with the first media content item and the second media content item;

creating a program listing based on the first metadata, wherein creating the program listing comprises giving the first media content item a higher priority in the program listing than the second media content item in response to determining that the current location is within the first region, that the first type of the first media content item is associated with the first region, and that the second type of the second media content item is not associated with the first region; and presenting the created program listing.

2. The method of claim 1 wherein the device comprises a set-top box, a personal communications device, a television, a mobile telephone, a personal digital assistant, a personal computer, a tablet computer, a gaming console, a media-restreaming device, a head-end server, a server, or a plurality of servers.

3. The method of claim 1 wherein the first media content item and the second media content item each comprise a movie, a television program, an audio program, a segment of video, a segment of audio, a song, a music video, or a game.

4. The method of claim 1 wherein identifying the first media content item and the second media content item are further based on social-presence information.

5. The method of claim 1 wherein the device comprises the first content-information source.

6. The method of claim 1 wherein the first metadata is associated with a service subscribed to by the user, a broadcast service, a television service, an audio service, a video-on-demand service, an Internet-content service, a game service, storage on the device, or storage remote from the device.

7. The method of claim 1 wherein creating the program listing comprises creating an electronic program guide.

8. The method of claim 1 wherein creating the program listing comprises listing price information associated with the first media content item and the second media content item.

9. The method of claim 1 wherein presenting the created program listing comprises presenting the program listing on a user interface of a personal communications device.

10. The method of claim 1 further comprising:
receiving, from a second content-information source distinct from the first content-information source, second metadata associated with the first media content item and the second media content item; and
wherein creating the program listing is further based on the second metadata.

11. The method of claim 10 further comprising sorting information in the program listing based on price information associated with the first media content item and the second media content item.

12. A system comprising:
an interface; and
a processor to communicate with the interface to:
determine a current location of a user;
determine that the current location is within a first region, wherein the first region is associated with a first user preference for a first type of media content based on previous interaction from the user with media content having the first type while the user is at a location within the first region, and wherein a second region is associated with a second user preference for a second type of media content based on previous interaction from the user with media content having the second type while the user is at a location within the second region;
identify a first media content item based on the first user preference for media content of the first type;
identify a second media content item based on the second user preference for media content of the second type;
receive, from a first content-information source, first metadata associated with the first media content item and the second media content item;
create a program listing based on the first metadata, wherein the program listing gives the first media content item a higher priority in the program listing than the second media content item in response to the determination that the current location is within the first region, that the first type of the first media content item is associated with the first region, and that the second type of the second media content item is not associated with the first region; and
present the created program listing.

13. The system of claim 12 wherein the processor and the interface are components of a set-top box, a personal communications device, a television, a mobile telephone, a personal digital assistant, a personal computer, a tablet computer, a gaming console, a media-restreaming device, a head-end server, a server, or a plurality of servers.

14. The system of claim 12 wherein the first media content item and the second media content item each comprise a movie, a television program, an audio program, a segment of video, a segment of audio, a song, a music video, or a game.

15. The system of claim 12 wherein the identification of the first media content item and the second media content item are further based on social-presence information.

16. The system of claim 12 further comprising the first content-information source.

17. The system of claim 12 wherein the first metadata is associated with a service subscribed to by the user, a broadcast service, a television service, an audio service, a video-on-demand service, an Internet-content service, a game service, storage on the system, or storage remote from the system.

18. The system of claim 12 wherein the program listing comprises an electronic program guide.

19. The system of claim 12 wherein the program listing comprises a list of price information associated with the first media content item and the second media content item.

20. The system of claim 12 wherein the presentation of the created program listing comprises presentation of the program listing on a user interface of a personal communications device.

21. The system of claim 12:
wherein the processor is further to receive, from a second content-information source distinct from the first content-information source, second metadata associated with the first media content item and the second media content item; and wherein the creation of the program listing is further based on the second metadata.

22. The system of claim 21 wherein the processor is further to sort information in the program listing based on price information associated with the first media content item and the second media content item.

* * * * *